(12) United States Patent
Atkinson

(10) Patent No.: US 7,760,717 B2
(45) Date of Patent: Jul. 20, 2010

(54) INTERFACE SWITCH FOR USE WITH FIBRE CHANNEL FABRICS IN STORAGE AREA NETWORKS

(75) Inventor: Michael W. Atkinson, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 900 days.

(21) Appl. No.: 11/258,510

(22) Filed: Oct. 25, 2005

(65) Prior Publication Data
US 2007/0091903 A1    Apr. 26, 2007

(51) Int. Cl.
*H04L 12/50* (2006.01)
*H04L 12/28* (2006.01)
*H04J 3/16* (2006.01)

(52) U.S. Cl. .................. 370/386; 370/357; 370/401; 370/465

(58) Field of Classification Search .................. 370/392, 370/393, 400, 401, 465, 466, 254, 255, 341–356, 370/395.51, 395.5, 395.2, 368, 338, 363, 370/467; 709/240, 249, 238, 245, 237
See application file for complete search history.

(56) References Cited

U.S. PATENT DOCUMENTS

| | | | |
|---|---|---|---|
| 5,363,367 A | 11/1994 | Kobayashi et al. | |
| 6,401,128 B1 | 6/2002 | Stai et al. | |
| 6,470,007 B1 | 10/2002 | Berman | |
| 6,608,819 B1 | 8/2003 | Mitchem et al. | |
| 6,763,417 B2 | 7/2004 | Paul et al. | |
| 6,985,490 B2 * | 1/2006 | Czeiger et al. ............. | 370/401 |
| 7,068,651 B2 | 6/2006 | Schmidt et al. | |
| 7,103,704 B2 | 9/2006 | Chatterjee | |
| 7,103,711 B2 | 9/2006 | Valdevit | |
| 7,107,347 B1 | 9/2006 | Cohen | |
| 7,305,069 B1 | 12/2007 | Day | |
| 7,340,167 B2 * | 3/2008 | McGlaughlin ............... | 398/45 |
| 7,542,676 B2 * | 6/2009 | McGlaughlin ............... | 398/45 |
| 2002/0023184 A1 | 2/2002 | Paul | |

(Continued)

OTHER PUBLICATIONS

"Fibre Channel Methodologies for Interconnects (FC-MI) Rev 1.8;" NCITS working draft proposed Technical Report; Sep. 28, 2001.

(Continued)

*Primary Examiner*—Daniel J. Ryman
*Assistant Examiner*—Thinh D Tran
(74) *Attorney, Agent, or Firm*—Wong, Cabello, Lutsch, Rutherford & Brucculeri LLP

(57) ABSTRACT

An interface switch which presents itself as switch to an enterprise fabric formed of the devices from the same manufacturer as the interface switch and that of a host or node to an enterprise fabric from a different manufacturer. This allows each enterprise fabric to remain in a higher performance operating mode. The multiplexing of multiple streams of traffic between the N_ports on the first enterprise fabric and the second enterprise fabric is accomplished by N_port Virtualization. The interface switch can be connected to multiple enterprise fabrics. All control traffic address mappings between virtual and physical addresses may be mediated and translated by the CPU of the interface switch and address mappings for data traffic performed at wire speed. Since the interface switch may preferably be a single conduit between the enterprise fabrics, it is also a good point to enforce perimeter defenses against attacks.

42 Claims, 15 Drawing Sheets

U.S. PATENT DOCUMENTS

| | | | |
|---|---|---|---|
| 2002/0116564 A1 | 8/2002 | Paul et al. | |
| 2003/0058853 A1* | 3/2003 | Gorbatov et al. | 370/389 |
| 2003/0076788 A1 | 4/2003 | Grabauskas et al. | |
| 2004/0013092 A1 | 1/2004 | Betker et al. | |
| 2004/0013125 A1 | 1/2004 | Betker et al. | |
| 2004/0024905 A1* | 2/2004 | Liao et al. | 709/239 |
| 2004/0081186 A1 | 4/2004 | Warren et al. | |
| 2004/0151174 A1* | 8/2004 | Del Signore et al. | 370/389 |
| 2005/0025075 A1* | 2/2005 | Dutt et al. | 370/299 |
| 2005/0044354 A1 | 2/2005 | Hagerman | |
| 2005/0198523 A1* | 9/2005 | Shanbhag et al. | 713/200 |
| 2005/0232285 A1 | 10/2005 | Terrell et al. | |
| 2006/0034302 A1* | 2/2006 | Peterson | 370/401 |
| 2006/0092932 A1* | 5/2006 | Ghosh et al. | 370/389 |
| 2007/0058619 A1 | 3/2007 | Gowda et al. | |
| 2007/0091903 A1 | 4/2007 | Atkinson | |
| 2008/0028096 A1 | 1/2008 | Henderson et al. | |

OTHER PUBLICATIONS

"Fibre Channel Methodologies for Interconnects—2 (FC-MI-2) Rev 2.60;" INCITS working draft proposed Technical Report; Jun. 7, 2005.

American National Standard for Information Technology; "Fibre Channel—Fabric Gneric Requirements (FC-FG)" Secretariat: Information Technology Industry Council; Approved Dec. 4, 1996: American National Standards Institute, Inc.

"Fibre Channel Switch Fabric (FC-SW) Rev 3.3;" NCITS working draft proposed American National Standard for Information Technology; Oct. 21, 1997.

"Fibre Channel Switch Fabric—2 (FC-SW-2) Rev 5.3;" NCITS working draft proposed American National Standard for Information Technology; Jun. 26, 2001 (pp. begin to 32 & 69-94).

"Fibre Channel Fabric—3 (FC-SW-3) Rev 6.6;" NCITS working draft proposed American National Standard for Information Technology; Dec. 16, 2003 (pp. begin to 30 & 91-116).

"Fibre channel Physical and Signaling Interface (FC-PH) Rev 4.3;" working draft proposed American National Standard for Information Systems; Jun. 1, 1994 (pp. begin to 32).

INCITS Working Draft Proposed American National Standard for Information Technology; "Fibre Channel Link Services (FC-LS) Rev 1.51" Sep. 6, 2006 Secretariat: Information Technology Industry Council.

* cited by examiner

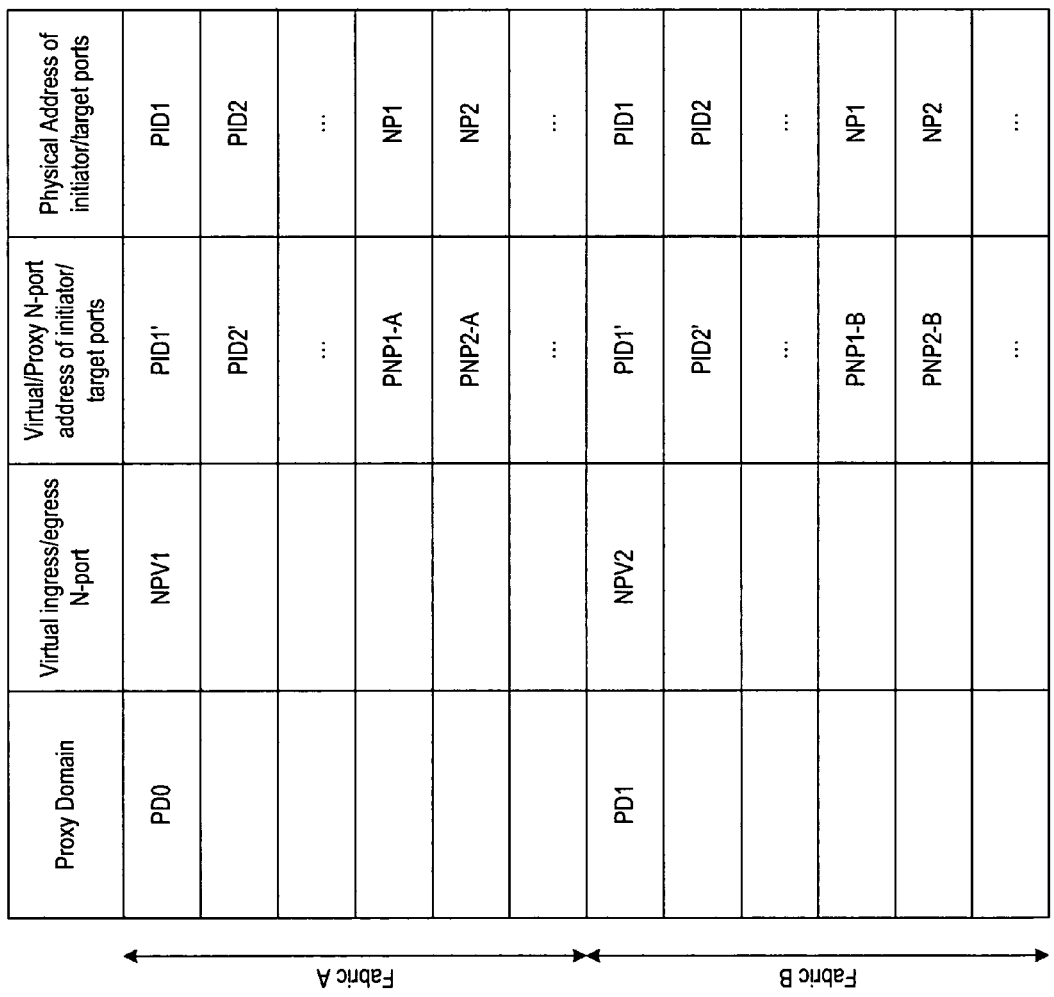

INTERFACE SWITCH FOR USE WITH FIBRE CHANNEL FABRICS IN STORAGE AREA NETWORKS

RELATED CASES

This case is related to U.S. patent applications Ser. Nos. 10/356,392, entitled "Method and Apparatus for Routing between Fibre Channel Fabrics," filed Jan. 31, 2003; 10/767,405, entitled "Isolation Switch for Fibre Channel Fabrics in Storage Area Networks," filed Jan. 29, 2004; and 11/208,412, entitled "Port Expander for Fibre Channel Fabrics in Storage Area Networks," filed Aug. 19, 2005, all of which are hereby incorporated by reference.

BACKGROUND OF THE INVENTION

1. Field of the Invention

This invention relates to storage area networking using the Fibre Channel protocol. More particularly, it relates to connection of fabrics in storage area networks.

2. Description of the Related Art

The scaling of dynamic Fibre Channel fabrics is a challenging problem. Currently there are compatibility concerns when switches from different manufacturers are used. A defined interoperability mode can be used, but this results in a loss of many of the performance improvement features that would be available in a single manufacturer fabric. As a result, a user is often locked into using devices from a particular manufacturer relatively early in the development of the storage area network. This limits the user from selecting devices from other manufacturers, even though the devices may be more cost effective or have features not available from the legacy manufacturer. It would be desirable to interconnect devices from different vendors without using interoperability mode and its resulting performance limitations.

SUMMARY OF THE INVENTION

An interface switch according to the present invention presents itself as switch to an enterprise fabric formed of the devices from the same manufacturer as the interface switch and that of a host or node to an enterprise fabric from a different manufacturer. This allows each enterprise fabric to remain in a higher performance operating mode. The multiplexing of multiple streams of traffic between the N_ports on the first enterprise fabric and the second enterprise fabric is accomplished by a feature in certain Fabric Operating Systems (FOS) called "N_port Virtualization" (NPV). One particular NPV mechanism is described in U.S. patent application Ser. No. 10/356,659 filed Jan. 31, 2003 and entitled "Method and Apparatus for Providing Virtual Ports with Attached Virtual Devices in a Storage Area Network" and in U.S. patent application Ser. No. 10/209,743 filed Jul. 31, 2002 and entitled "Method and Apparatus for Virtualizing Storage Devices inside a Storage Area Network Fabric." Further information is provided in U.S. patent application Ser. No. 10/201,331 filed Jul. 23, 2002 and entitled "Fibre Channel Virtual Host Bus Adapter." The disclosures of these three patent applications are incorporated herein by reference. Using the NPV mechanism, the number of nodes or targets that can communicate between the enterprise fabrics, and to which virtual N_port identifiers can be assigned, is 255 (using a one-byte port id), which is a sufficiently large number to accommodate all but the largest networks.

An interface switch according to the present invention can be connected to multiple enterprise fabrics, so the N_port identifiers within the enterprise fabrics may be mapped to proxy addresses that are scoped by the fabric. All control traffic address mappings between virtual and physical addresses may be mediated and translated by the CPU of the interface switch and address mappings for data traffic performed at wire speed.

The use of N_port virtualization also enables the interface switch to act as an initiator, which is advantageous as this allows partitioning of fabrics and isolation between the two enterprise fabrics for exchanges originating on one of the enterprise fabrics. Since the enterprise fabrics are not directly connected, the two enterprise fabrics are isolated from large amounts of fabric activity coming from other enterprise fabrics. This isolation promotes scalability within each enterprise fabric. Additionally, this isolation avoids merging the two enterprise fabrics, which could result in performance issues or even fabric segmentation. Since the interface switch may preferably be a single conduit between the enterprise fabrics, it is also a good point to enforce perimeter defenses (similar to a firewall) against attacks, either intentional or resulting from misbehaviors. The interface switch may also act as a throttle by controlling the accesses between the enterprise fabrics. Further, the interface switch may act as a protocol gateway.

BRIEF DESCRIPTION OF THE DRAWINGS

FIG. 7 is an exemplary PID mapping table according to the present invention.

DETAILED DESCRIPTION

This disclosure describes the architecture of an interface switch according to the present invention. The role of an interface switch is to allow connection of fabrics formed by switches of different manufacturers without requiring the use of interoperability mode.

Figure 1:
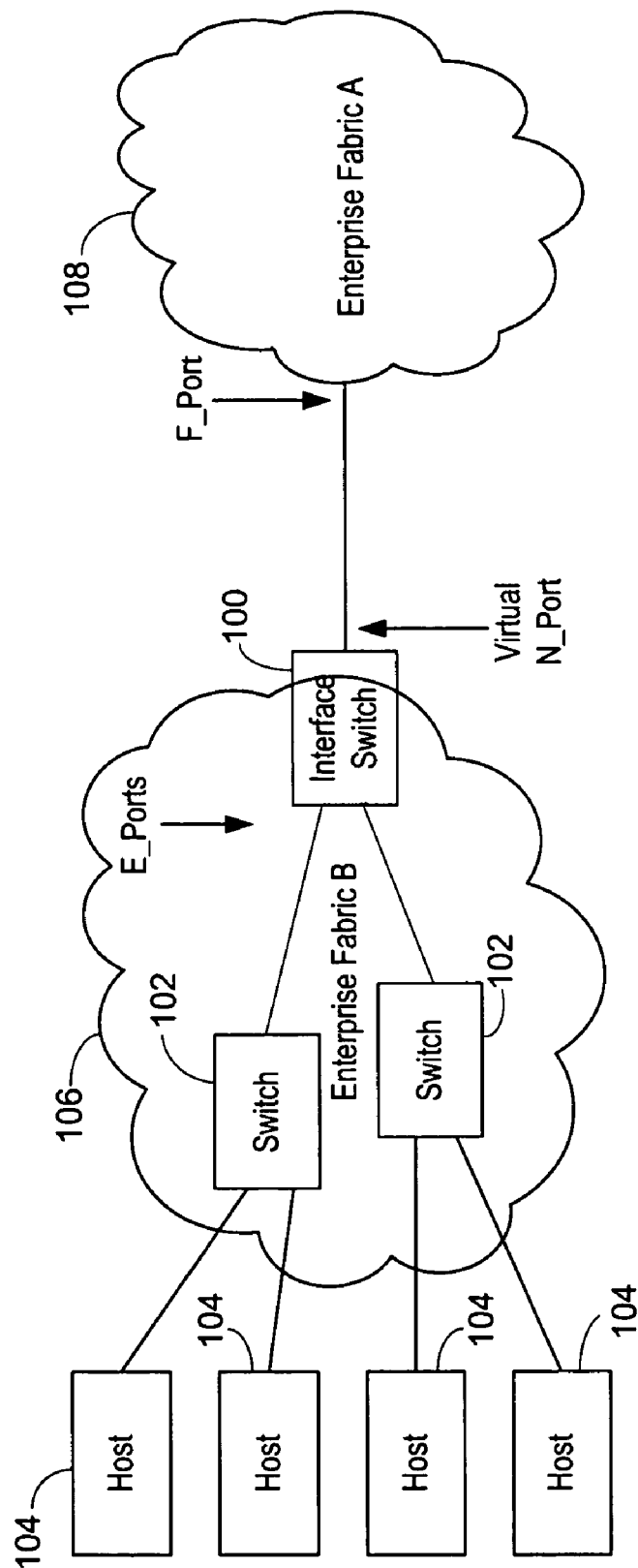
FIG. 1 is a schematic representation of an interface switch in logical communication with two enterprise fabrics according to the present invention.

An interface switch is similar to a conventional switch in that it presents standard inter-switch or E_ports (fabric ports to which other E_ports attach) to the other switches in one enterprise fabric, but different in that it connects to the other enterprise fabric as N_ports (rather than as E_ports) in the preferred embodiment. The interface switch partitions the enterprise storage area network (SAN) into two separate fabrics. FIG. 1 shows a possible deployment of the interface switch 100 connected to switch 102 with a series of hosts 104 which illustrates how two distinct logical fabrics, the enterprise fabric B 106 and the enterprise fabric A 108, are being constructed.

The interface switch 100 replicates some of the functionality of a Fibre Channel fabric bridge. However the interface switch 100 is quite different from, and consequently simpler than, a fabric bridge.

Figure 2:
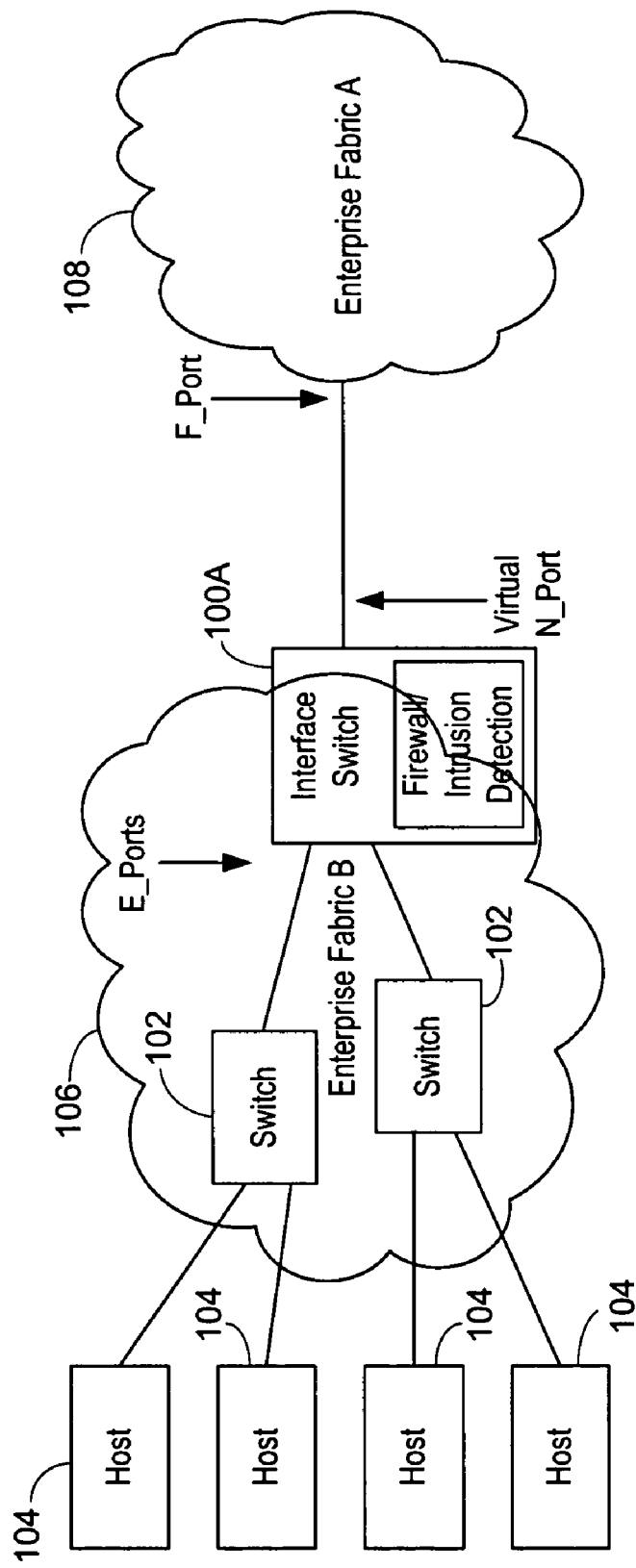
FIG. 2 is a schematic representation of a Fibre Channel enterprise fabric in logical communication with a firewall/intrusion detector in an interface switch according to the present invention.

As illustrated in FIG. 2, one may dual-connect each host 104 to multiple interface switches 100A, 100B in order to eliminate a single point of failure. This dual-connect is conventional in existing SANs and the interface switch allows such a configuration to be maintained.

Aspects of the present invention involve isolating two enterprise fabrics via the interface switch 100. Scalability of each enterprise fabric is enhanced due to isolation provided by the interface switch 100 such that the enterprise fabrics 106 and 108 are not directly impacted when events occur in the other enterprise fabric, except when the specific connected nodes are effected, and hence can provide a more controlled environment to the enterprise fabrics 106 and 108. A major advantage of using the interface switch 100 is that enterprise fabrics formed from switches of different manufacturers can be connected without impairing the performance in the enterprise fabrics and without requiring expensive bridges. This result happens because of the use of the virtual N_port. The proprietary links in the enterprise fabrics are the interswitch links (ISLs). The node links are not proprietary. Thus the use of the virtual N_port to connect the two enterprise fabrics allows each enterprise fabric to maintain its internal proprietary links, presuming that the interface switch conforms to one of the proprietary formats, with the resulting performance advantages, but allows a standardized, non-proprietary link to be used to connect the two enterprise fabrics.

Since the interface switch 100 places itself in the control path of any traffic that originates on the hosts 104 and may be intended for the enterprise fabric 108, the interface switch 100 is a viable base for hosting software that can perform port and Logical Unit Number (LUN) filtering, zoning enforcement, stateful inspection, checking for malformed packets, probing for buffer overflows in the FOS copies in the blade center fabric, and performing overall in-band intrusion detection. In other words, the interface switch 100 can fulfill a secondary purpose of providing enhanced security at the perimeter of the enterprise fabrics 106 and 108 by acting in the role of a "firewall" by selectively filtering out frames that match certain criteria of deviant behavior. FIG. 2 shows one such implementation in schematic form wherein a firewall/intrusion detection system is hosted on interface switch 100A. With this location, the interface switch 100 may also act as a protocol gateway, such as iSCSI to FCP and so on.

Figure 3:
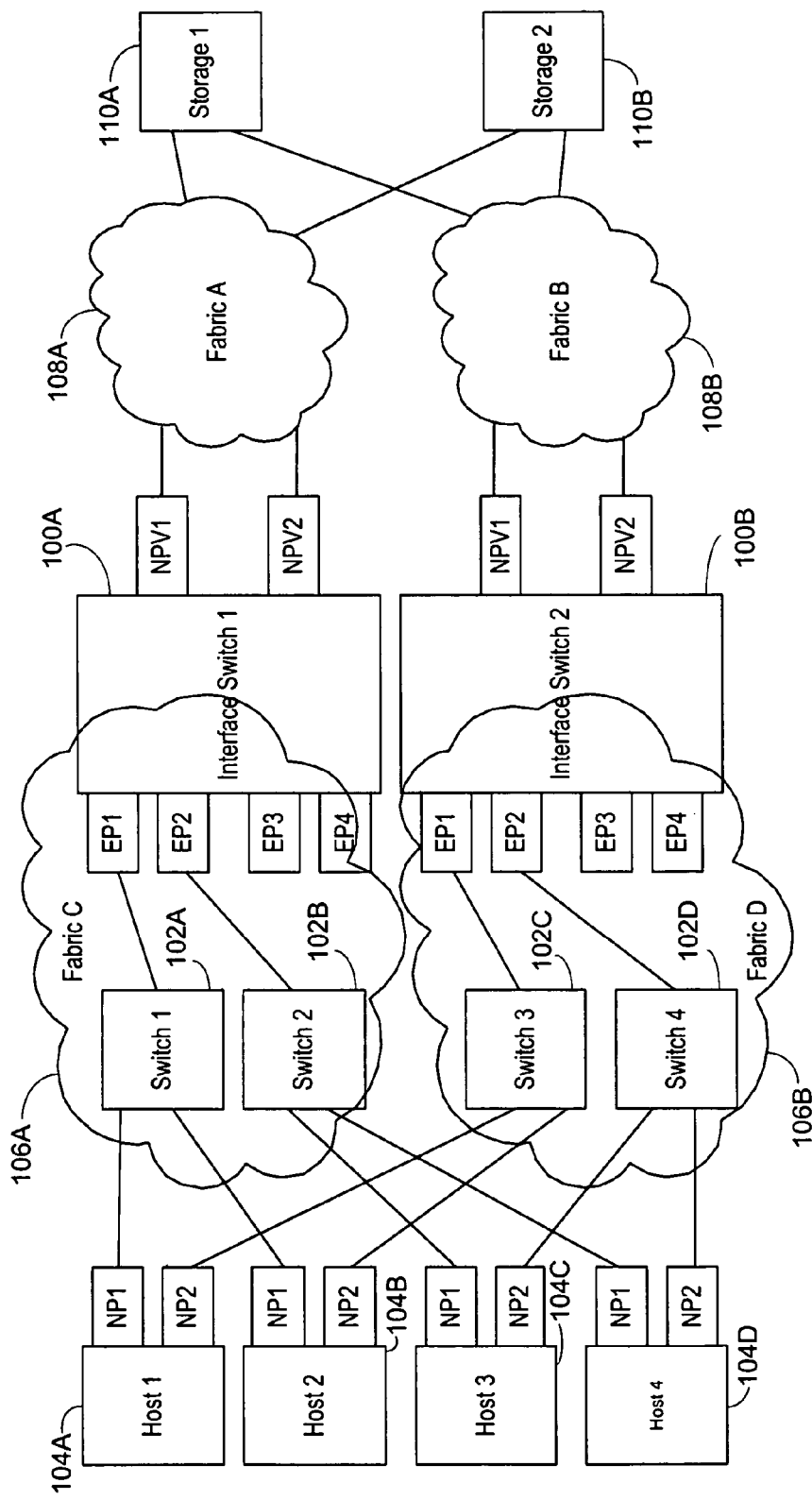
FIG. 3 is a schematic representation of interface switches with path failover according to the present invention.

The interface switch 100 may be designed to provide path failover capability. FIG. 3 shows an interface switch configuration with path failover. If one path to a fabric 108A or 108B is lost due to a link going down between the interface switch 100A or 100B and the fabric 108A, 108B, the interface switch 100A, 100B may automatically switch the outgoing traffic to the other port and fill the appropriate SID in the frames, as long as this port is zoned to the target, if it is port zoned, based on which port the frames are sent through.

Figure 3A:
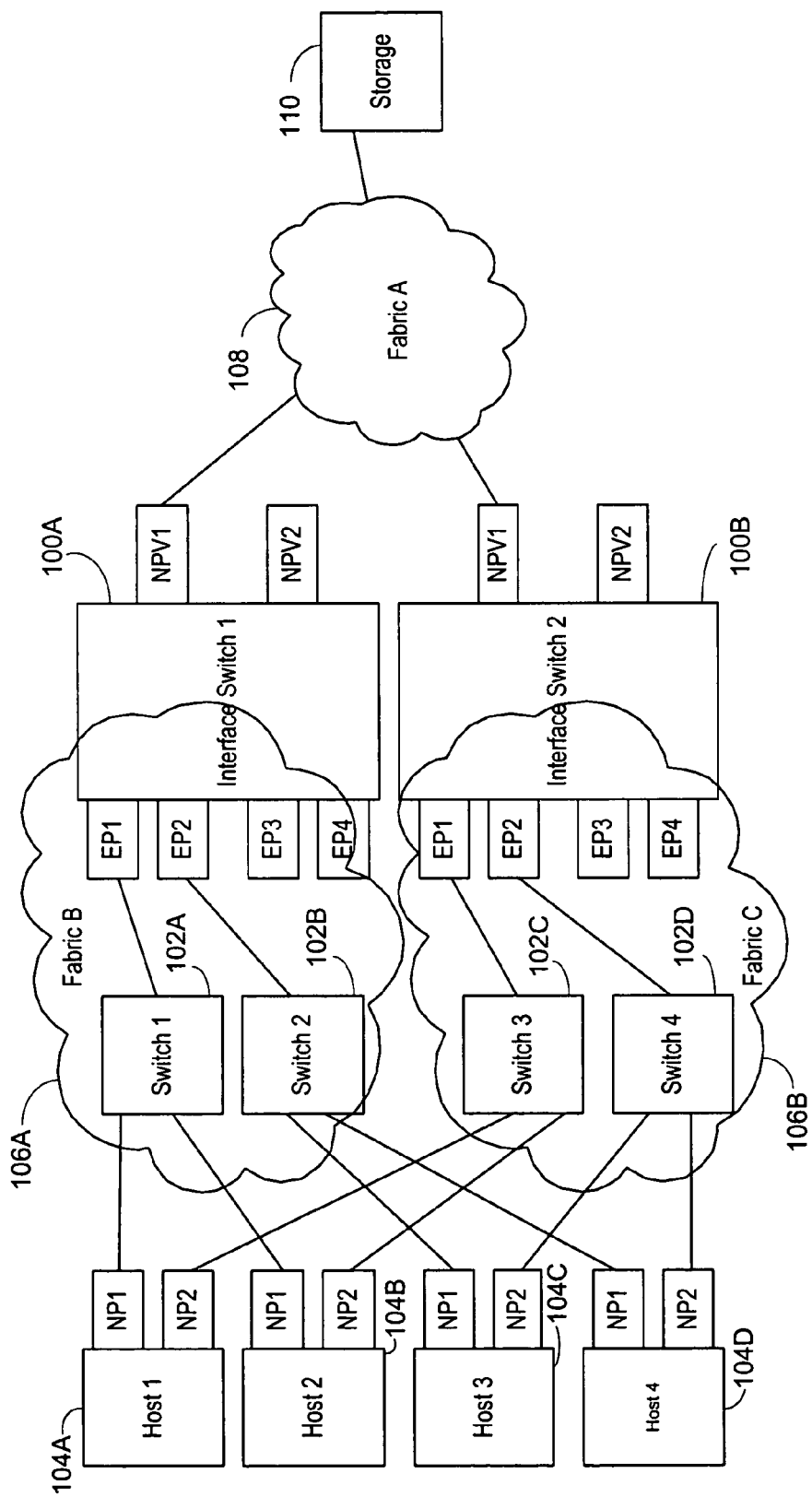
FIGS. 3A and 3B are schematic representations of parallel fabrics and interface switches according to the present invention.
Figure 3B:
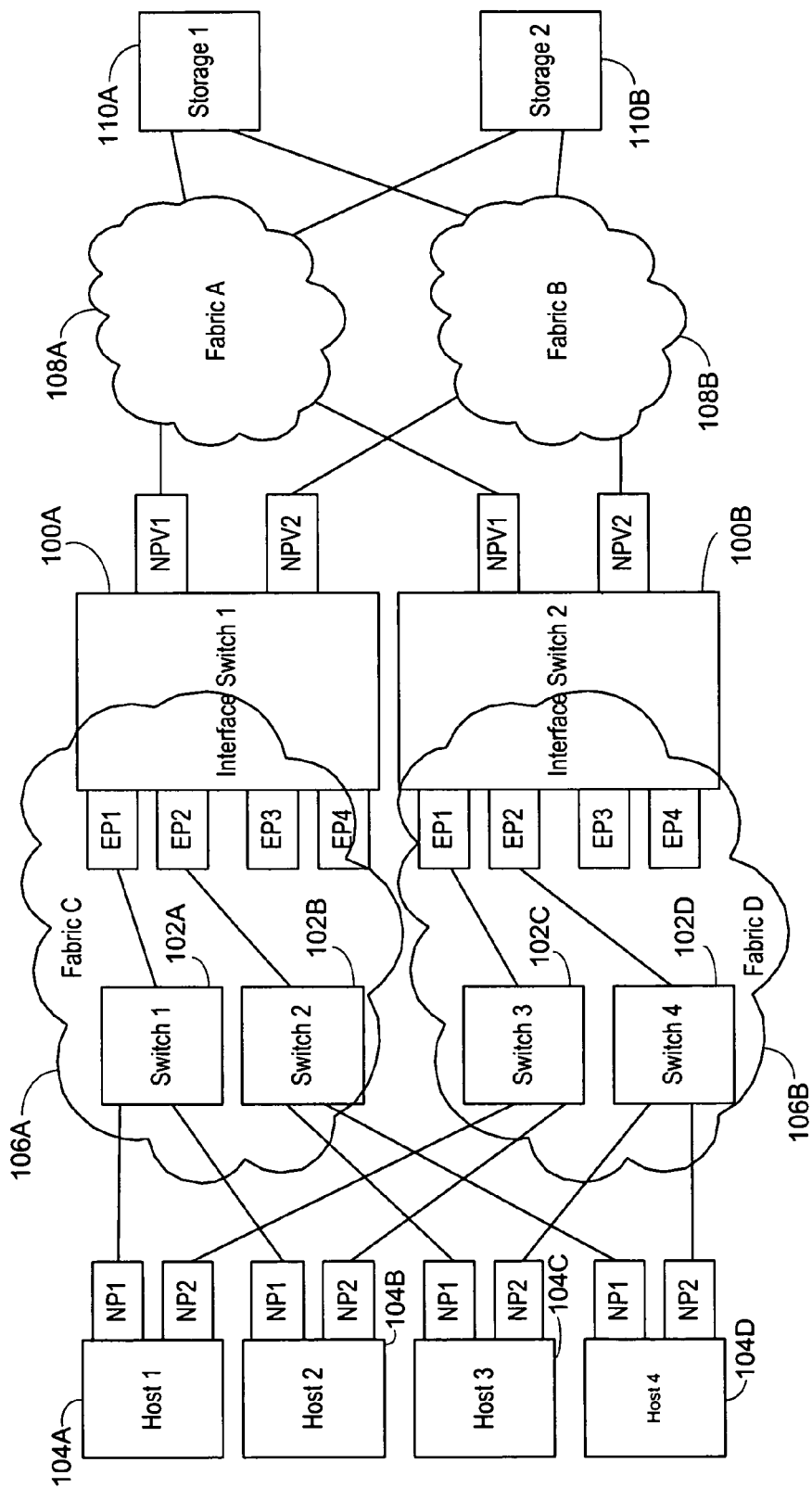

FIGS. 3A and 3B are redundant configurations to provide more complete failover solutions. In FIG. 3A each host 104 is connected to separate enterprise fabrics 106A and 106B, which include separate interface switches 100A and 100B. Each interface switch 100A, 100B is connected to the enterprise fabric 108. In FIG. 3B even the enterprise fabric 108 is duplicated as enterprise fabrics 108A and 108B, with redundant storage 110A and 110B. Each interface switch 100A, 100B is connected to both enterprise fabrics 108A and 108B.

Figure 4A:
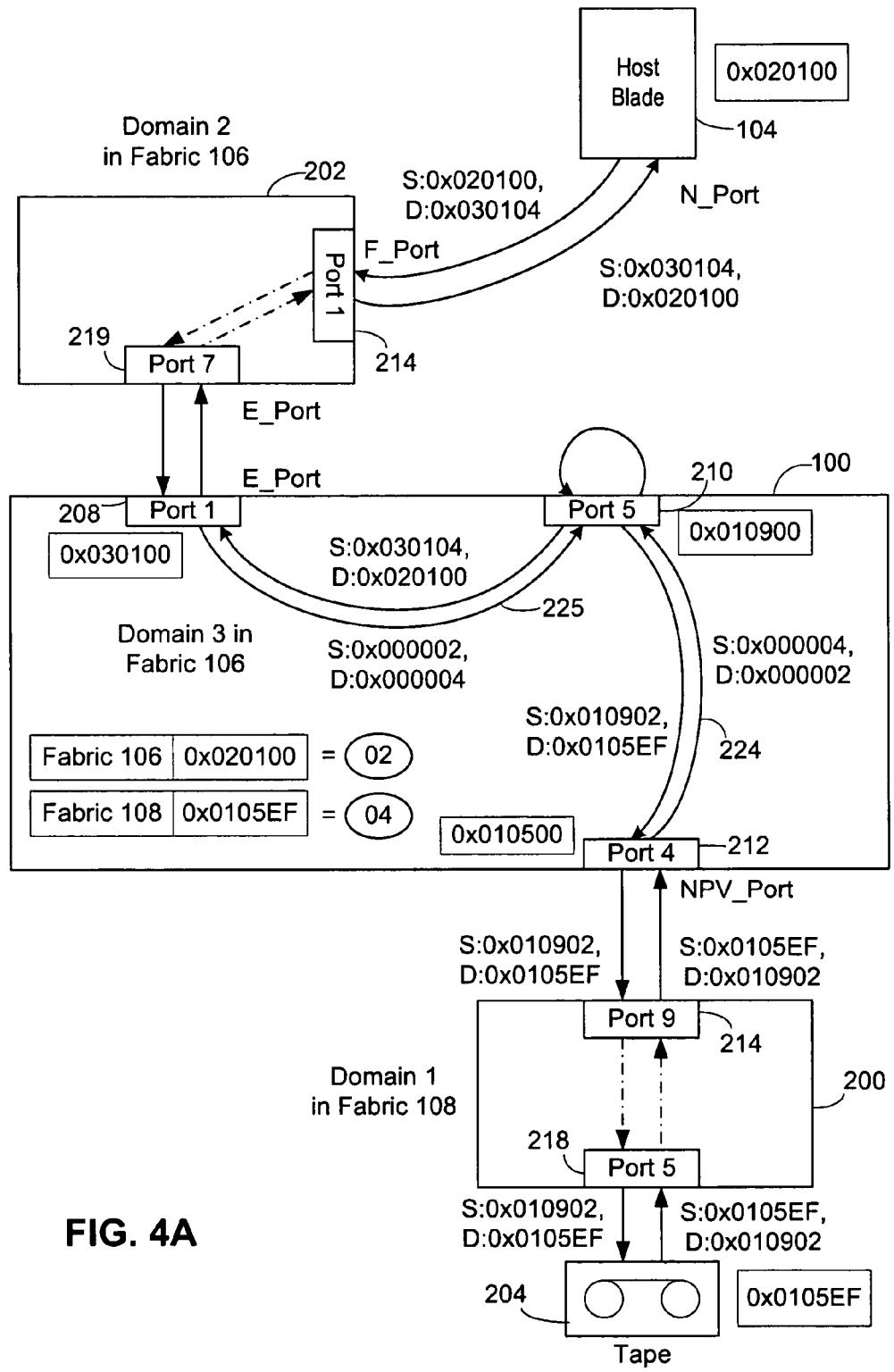
FIG. 4A is a first representation of frame flow from a node in one enterprise fabric to a node in another enterprise fabric according to the present invention.

A first detailed example of the transfer of frames using an interface switch is shown in FIG. 4A. The interface switch 100 is connected to a switch 200, which is representative of the enterprise fabric 108, and to a switch 102, which is representative of the enterprise fabric 106. In the illustrated example, port 1 208 of the interface switch 100 is connected to port 7 219 of the switch 202. The port 1 208 is configured in E_port mode. Similarly, port 4 212 of the interface switch 100 is connected to a port 9 214 of switch 200, a switch in the enterprise fabric 108. The port 4 212 is configured in NPV_port mode, while the port 9 214 is configured in F_port mode. A tape drive unit 204 is connected to port 5 218 of switch 200. A host 104 is connected to port 214 of switch 202. It is presumed that the switch 200 is domain 1 in fabric 108, switch 202 is domain 2 in fabric 106 and the interface switch 100 is domain 3 in fabric 106.

Port 4 212 is connected by a private intraswitch link 224 to port 5 210. Port 5 210 is connected to port 1 208 by a private intraswitch link 225. Port 5 210 is configured in loopback mode. This is done because in this embodiment public and private translations are only performed on the external receiver portion of a port, so an intervening port is needed to perform address translation. In alternate embodiments (as described below) each port can do the necessary address translations and this intermediate port is not needed. The host 104 and the tape unit 204 have phantom addresses on the private links 224 and 225. In the illustrated embodiment, the address 04 is provided to the tape unit 204 and the address 02 is provided for the host 104. Thus private to public translations occur at port 5 210 and public to private translations occur at port 1 208 and port 4 212. For more detail on performing these translations, please refer to U.S. Pat. No. 6,401,128 entitled "System and Method for Sending and Receiving Frames between a Public Device and a Private Device," which is hereby incorporated by reference.

In the illustrated embodiment, the tape unit 204 receives private address 04 and the host 104 receives private address 02. Port 5 210 is assigned an address 010900, while port 4 212 is assigned an address of 010500 and port 1 208 is assigned an address of 030100. Thus the host 104 will address the tape drive 204 by providing a destination address of 030104 that is a full public address. This address of 030104 is converted by port 1 208 to a private address of 04. This private address of 04 in turn is translated by port 5 210 to an address of 0105EF, which is the actual address of the tape unit 204 in fabric 108. The source address of the host 104 is 020100 and is converted to 02 by port 1 208 and then to 010902 by port 5 210. For the tape unit 204 to address the host 104, a destination address of 010902 is used. This address of 010902 is converted by port 4 212 into a private address of 02. Packets transmitted from port 5 210 to the port 1 208 are then converted from this private address of 02 to the desired address of 020100 for the host 104 by port 5 210. Similarly, port 4 212 converts the tape unit 204 source address of 0105EF to 04 and port 5 210 converts this address to 030104.

If public to private address translation as described above is not available, other suitable address translation techniques which allow full wire speed operation may be used.

Thus each node in enterprise fabric A 108 is represented in the enterprise fabric B 106 by a virtual node connected to the E_port of the interface switch 100, while each node in the enterprise fabric B 106 receives a virtual node address in enterprise fabric A 108 through the operation of the virtualized N_port.

Figure 4B:
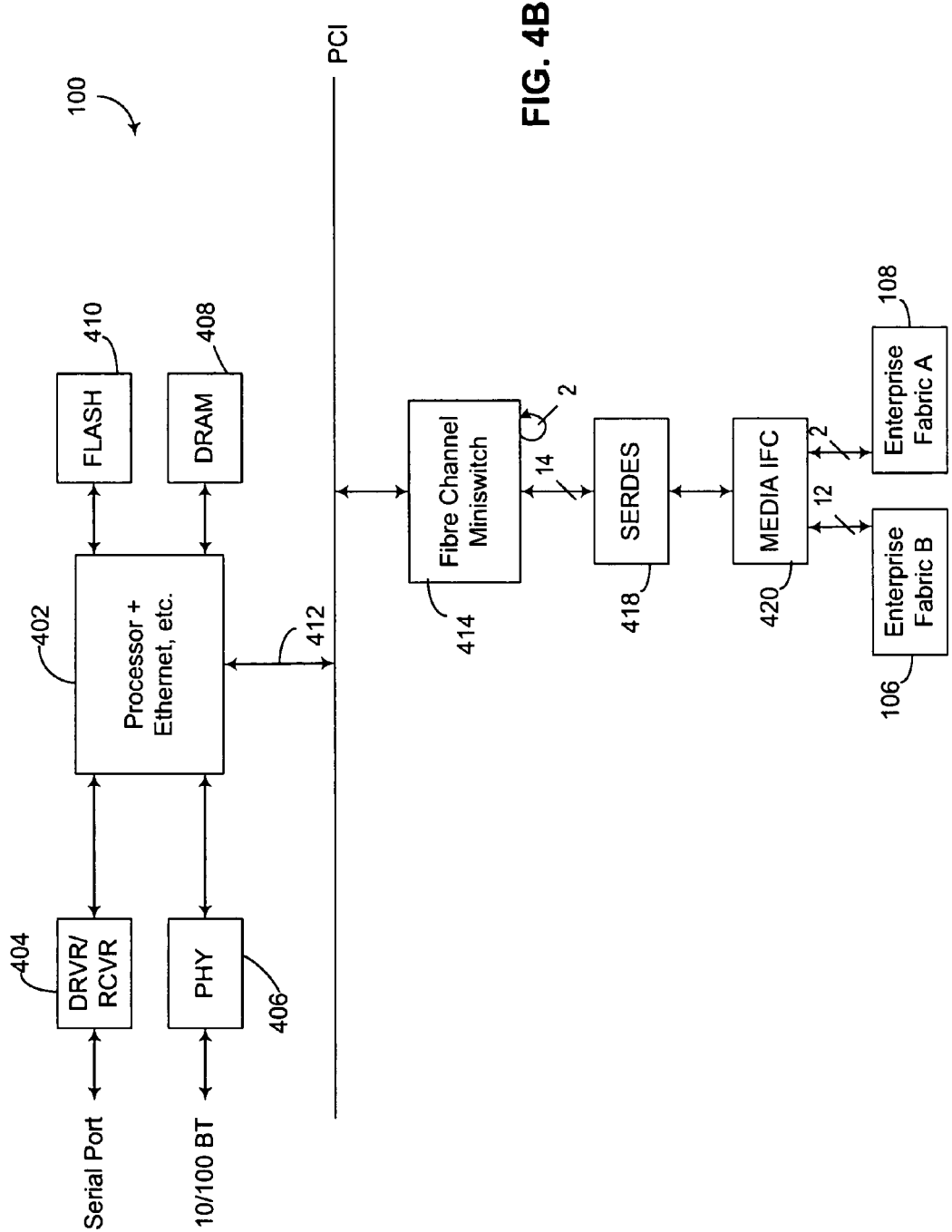
FIG. 4B is a block diagram of an exemplary interface switch according to the present invention configured to operate as FIG. 4A.

FIG. 4B illustrates a block diagram of an interface switch 100 according to a first preferred embodiment. In switch 100 a processor unit 402 that includes a high performance CPU, preferably a PowerPC, and various other peripheral devices including an Ethernet module, is present. Receiver/driver circuitry 440 for a serial port is connected to the processor unit 402, as is a PHY 406 used for an Ethernet connection. A flash memory 410 is connected to the processor 402 to provide permanent memory for the operating system and other routines of the interfabric switch 120, with DRAM 408 also connected to the processor 402 to provide the main memory utilized in the interface switch 100. A PCI bus 412 is provided by the processor 402 and to it is connected a Fabric Channel miniswitch 414. The Fibre Channel miniswitch 414 is preferably developed as shown in U.S. patent application Ser. No. 10/123,996, entitled, "Fibre Channel Zoning By Device Name In Hardware," by Ding-Long Wu, David C. Banks, and Jieming Zhu, filed on Apr. 17, 2002 which is hereby incorporated by reference. This application also describes a hardware filtering mechanism that can be used for filtering, zoning, malformed packet detection, intrusion detection and other aspects of the interface switch 100C. The miniswitch 414 is thus effectively a 16 port switch. Fourteen ports of the miniswitch 414 are connected to a series of serializers 418, which are then connected to media unit 420. Twelve of the media units 420 are for connection to fabric 106 and two media units 420 are for connections to enterprise fabric or fabrics 108. Two of the ports of the miniswitch 414 are configured in loopback mode such as in port 5 210 in FIG. 4A. There are two loopbacks in this embodiment to match the number of enterprise fabric ports. In the preferred embodiment, if two separate enterprise fabrics 108 are connected to the interface switch 100, for example as shown in FIG. 4, an additional loopback port may be needed to provide an additional address translation for one of the fabrics should the connected domains of the enterprise fabrics be the same. This case would reduce the number of available host blade connections to eleven.

Figure 4C:
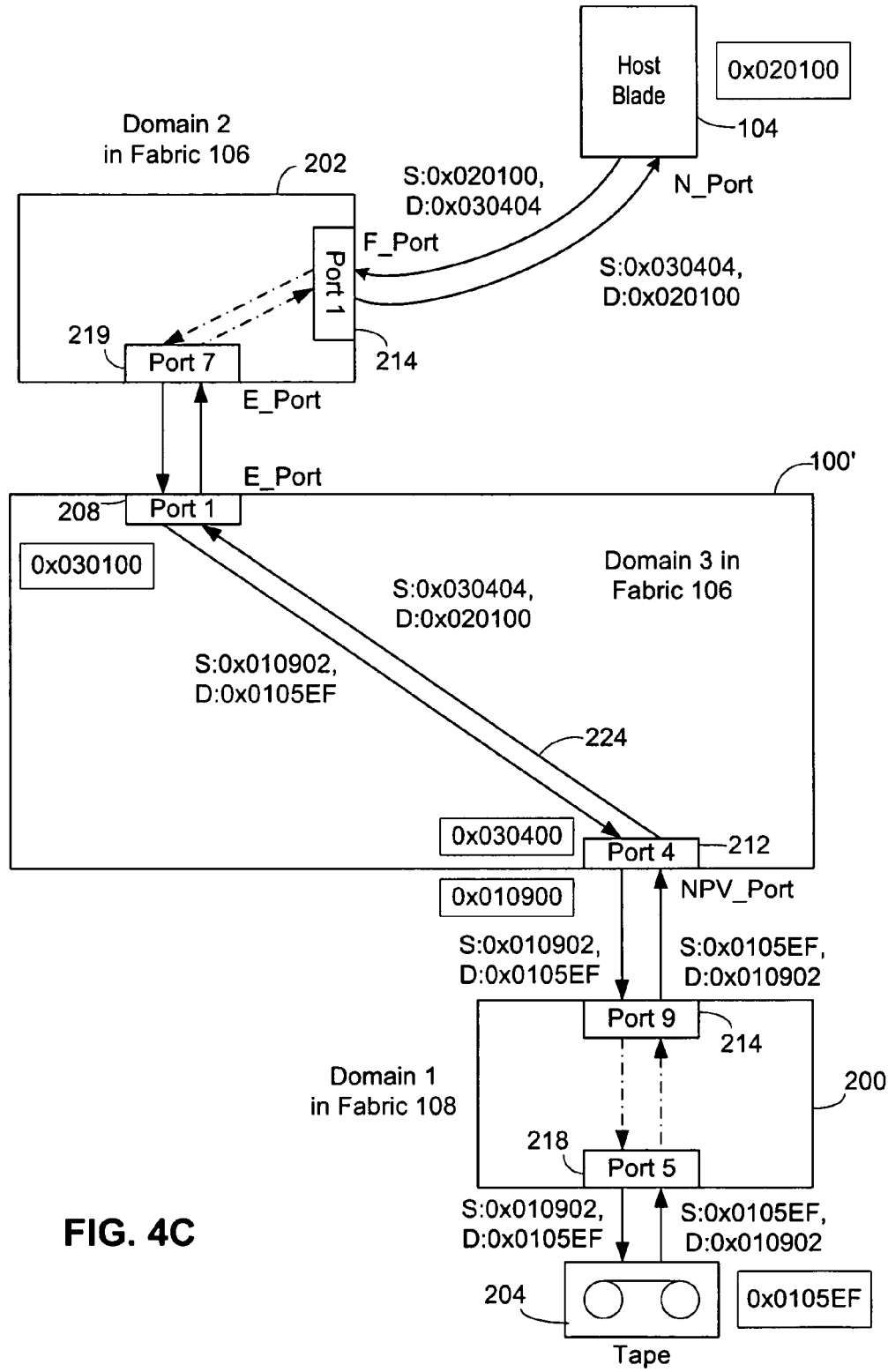
FIG. 4C is a second representation of frame flow from a node in one enterprise fabric to a node in another enterprise fabric according to the present invention.

FIG. 4C is a second detailed example of the transfer of frames using an interface switch. In this embodiment an interface switch 100' provides direct connections between port 1 208 and port 4 212. In this embodiment address translations are performed for any type of address, public or private, and occur after a frame is routed and before delivery to the egress port. In this embodiment the tape drive 204 is assigned an address in enterprise fabric 106 based on being connected to port 4 212. In the illustrated embodiment this address is 030404. Thus a frame from host 104 to tape drive 204 has a source address of 020100 and a destination address of 030404. When this frame is received at port 1 208, it is routed to port 4 212 and then the addresses are converted to a source of 010902 and a destination of 0105EF, to correspond to the relevant addresses in enterprise fabric 108. Port 4 212 receives the address-translated frame and provides it to port 9 214 of switch 200, which then routes it normally.

The reverse flow is similar. Port 4 212 receives a frame from tape drive 204 to host 104 which has a source address of 0105EF and a destination address of 010902. Using AL_PA routing this frame is routed to port 1 208 and then translated to have a source address of 030404 and a destination address of 020100. Port 1 208 receives the frame and provides it to port 7 218 in switch 202 for normal routing.

In this embodiment each node in enterprise fabric A 108 is represented in the enterprise fabric B 106 by a virtual node connected to the enterprise fabric B 106 address for the virtual N_port, which is a slight difference from the prior embodiment.

Figure 4D:
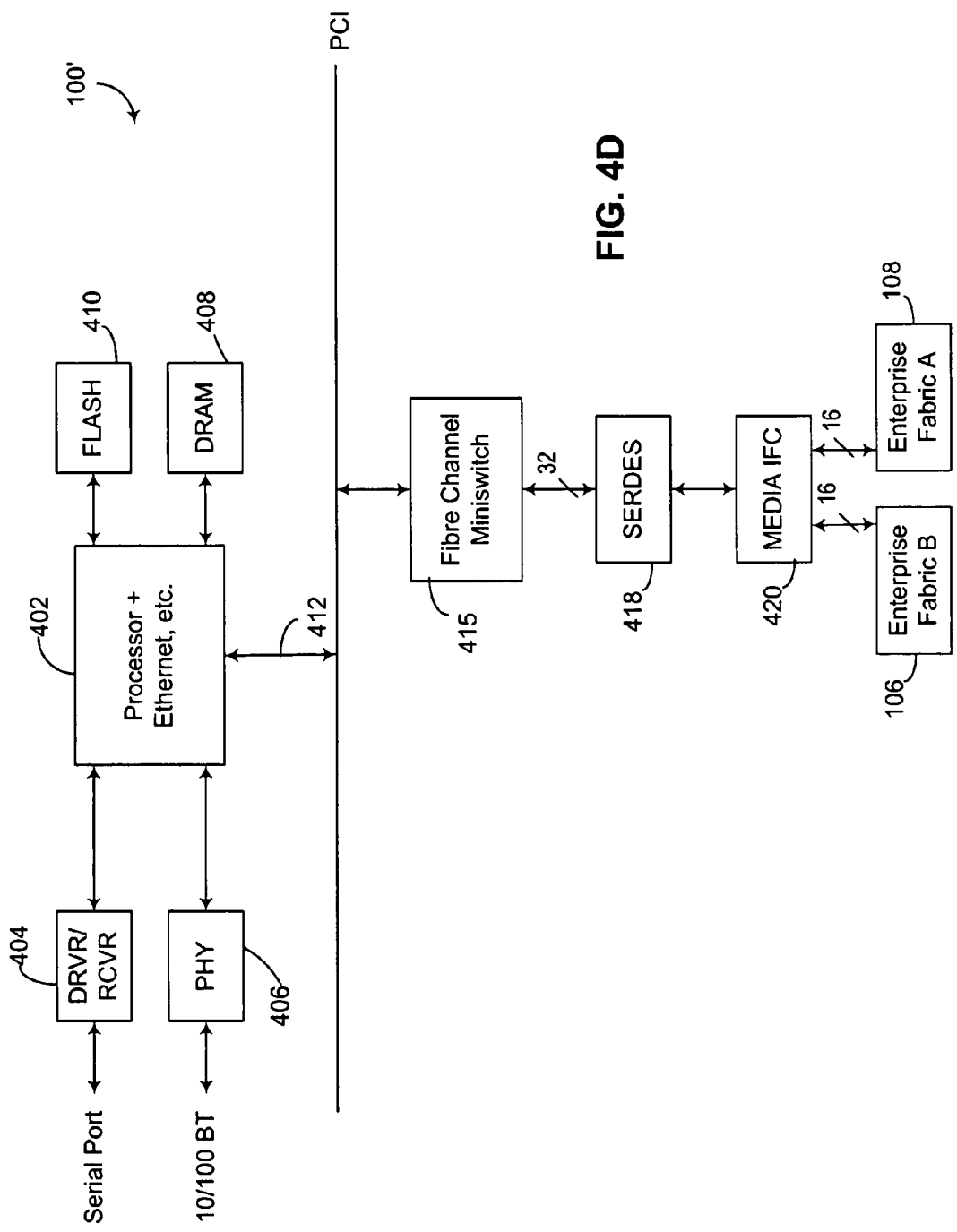
FIG. 4D is a block diagram of an exemplary interface switch according to the present invention configured to operate in FIG. 4C.

FIG. 4D is an embodiment of an interface switch 100' with a larger number of connections and not including ports in loopback mode. In this embodiment the miniswitch 415 is preferably a 32 port device. The illustrated version has sixteen ports connected to each enterprise fabric A and B 108 and 106.

Figure 5:
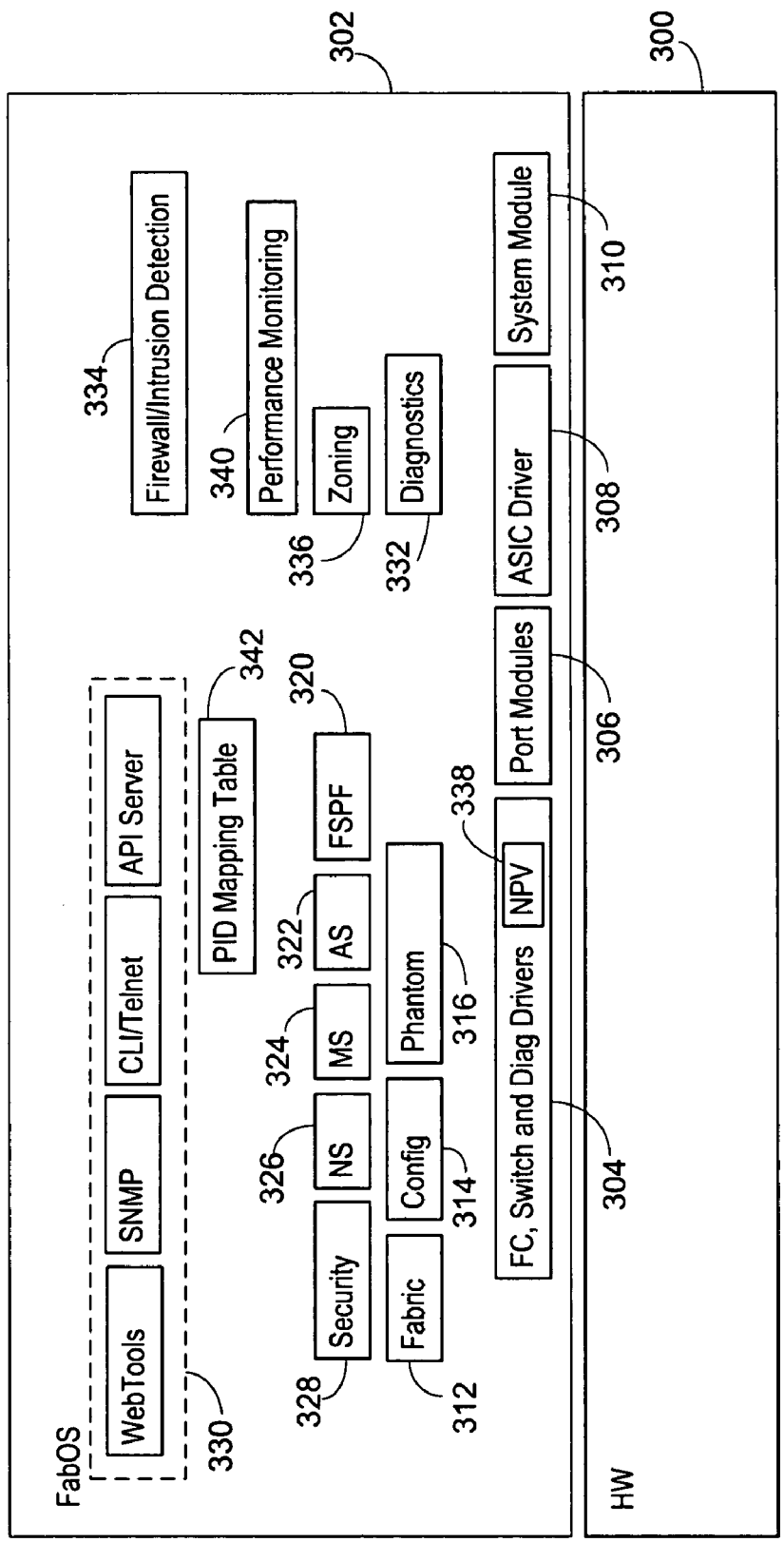
FIG. 5 is an illustration of the software modules in an interface switch according to the present invention.

Proceeding then to FIG. 5, a general block diagram of the interface switch 100 hardware and software is shown. Block 300 indicates the hardware as previously described. Block 302 is the basic software architecture of the interface switch. Generally think of this as the interface switch fabric operating system and all of the particular modules or drivers that are operating within that embodiment. Modules operating on the operating system 302 are Fibre Channel, switch and diagnostic drivers 304; port modules 306, if appropriate; a driver 308 to work with the Fibre Channel miniswitch ASIC; and a system module 310. Other switch modules include a fabric module 312, a configuration module 314, a phantom module 316 to handle private-public address translations, an FSPF or Fibre Shortest Path First routing module 320, an AS or alias server module 322, an MS or management server module 324, a name server (NS) module 326 and a security module 328. Additionally, the normal switch management interface 330 is shown including web server, SNMP, telnet and API modules.

Three additional modules are present according to the present invention. A firewall/intrusion detection module 334 performs those features as described. A PID mapping table 342 is present and accessible by any of the modules as needed. Finally, a virtual node port module 338 performs the node port virtualization function. This module 338 is included in the drivers 304 in the preferred embodiment.

The link initialization protocol of a host 104 is the same as that of a normal N_port as described in the FC-PH and FC-FS standards. Similarly, the link initialization protocol between the E_ports on the switch 102 and the interface switch 100 occur normally. Additionally, the link initialization between the virtual N_port of the interface switch 100 and the enterprise fabric 108 are done according to the standard for N_port virtualization. All of these link initializations can happen independently of each other.

The introduction of the first host 104 into the enterprise fabric 106 causes an FLOGI into the switch 102. This results in an update between the name server in the switch 102 and the name server in the interface switch 100. When this login is detected, the interface switch 100 performs an FDISC with the enterprise fabric 108 to register the host 104 with that fabric. It is assumed that the interface switch 100 will have performed an FLOGI when it initialized the virtual N_port. The FDISC operation by the interface switch 100 provides the virtual port id (PID) assignment for that host 104 This process is described more completely in U.S. patent application Ser. No. 10/291,331 incorporated by reference above.

The name server of the enterprise fabric 108 will thus be populated with the virtual N_port ids representative of the host 104 N_ports. A mapping of the NPV pid to the N_port pid is maintained by the interface switch 100 as described below. Since the enterprise fabric 108 may not be ready to respond to the FDISC from the interface switch 100, the interface switch 100 must retry the FDISC some number of times until successful or disable the port.

The interface switch 100 has to present a facade of a switch to the enterprise fabric 106 and of a host to the enterprise fabric 108 and be able to propagate any relevant control traffic/management requests between the enterprise fabric 106 and the enterprise fabrics 108. This is described below.

Figure 6:
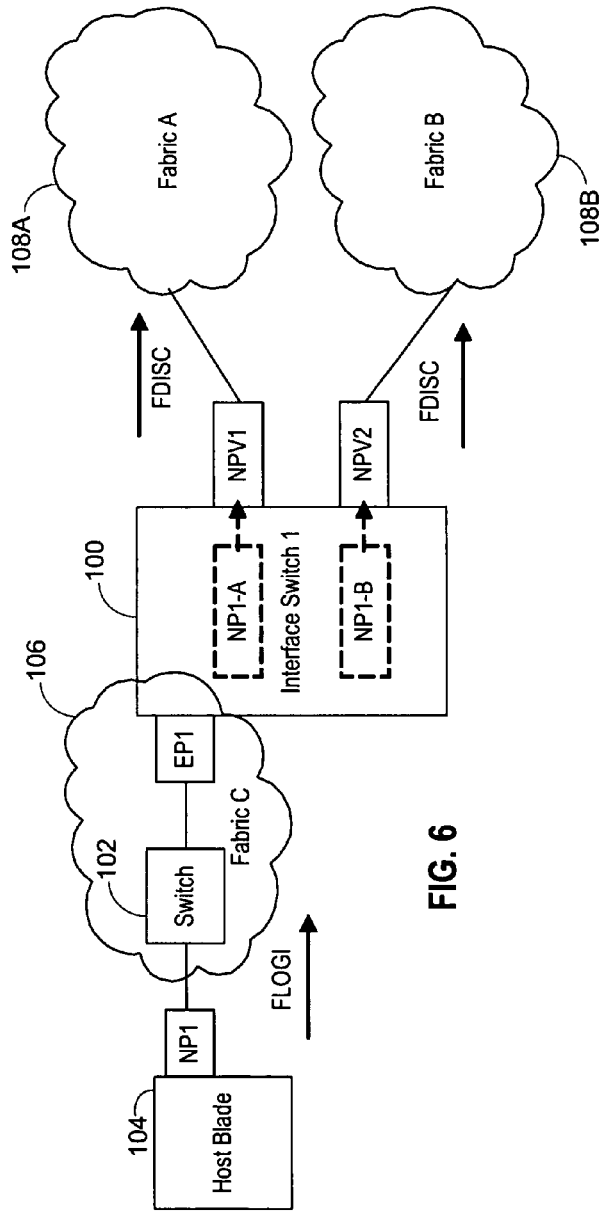
FIG. 6 depicts a fabric initialization and login procedure according to the present invention.

During the initial switch and fabric bring-up phases, a large number of activities occur simultaneously. The interface switch 100 decouples the fabric bring up of the enterprise fabric 108 from the enterprise fabric 106 and, as a result, the enterprise fabric 106 and enterprise fabrics 108 may be brought up in any order and independently of each other. The two bring up scenarios are described below 1. Bringing up the enterprise fabrics 108 before the enterprise fabric 106:

Referring now to FIG. 6, consider enterprise fabrics A and B 108A and 108B being brought up first such that these fabrics are built, zoning starts doing zone merges, and edge devices connected to these fabrics try to do FLOGI and then query the name server (NS). When an interface switch 100 is connected to fabrics A and B 108A and 108B, it can now FLOGI into these fabrics. However, if the switches in fabrics A and B 108A and 108B have not completed fabric initialization at this time, when the interface switch 100 is connected to them (i.e. not yet obtained their domain IDs), they may disable the port on which they receive the FLOGI. Once the domain id has been assigned, they may re-enable the port. As a result, the enterprise fabrics 108 have an opportunity to quiesce before they respond to the interface switch 100 FLOGIs, since the interface switch 100 is attempting to connect as a device and not as a switch. Eventually, the switch in fabric 108 may send an LS_ACC responding to the FLOGI with an N_port id for the interface switch 100 port that performed the FLOGI. When the interface switch 100 has completed FLOGI with the enterprise fabric 108, it queries the name server in fabric 108 to determine all of the available nodes. These nodes are then assigned virtual port ids (PIDs) as being connected to the relevant port of the interface switch 100. These PIDs are then registered with the name server for the enterprise fabric 106 in the interface switch 100, resulting in the nodes on enterprise fabric 108 appearing in enterprise fabric 106. Once the nodes from enterprise Fabrics A and B 108A and 108B are virtualized into the interface switch-100, N_port 1 can do a PLOGI into the devices and continue with other operations as usual.

Alternatively, the interface switch 100 may forward the name server query from the host 104 to the enterprise fabric 108 and return the responses back to the host 104 after performing the necessary address translation of the name server response payload.

Subsequently, when a host 104 is connected to the enterprise fabric 106 and a FLOGI is performed from N_port 1 (NP1), the interface switch 100 may then send an FDISC to the enterprise fabric 108 for host 104 and may receive a virtual N_port id for N_port 1. In an alternate embodiment, the virtual N_port ids can be assigned a priori (i.e., before the host 104 is connected) so that a virtual PID is assigned before the host 104 is connected. This may provide further independence between the enterprise fabric 106 and enterprise fabric 108 operations. However, this approach may result in unnecessary name server entries being created in the enterprise fabric 108 if the host 104 does not exist. Also, Port Logins (PLOGI's) to these virtual N_ports may have to be rejected in cases where the host 104 does not exist or the interface switch 100 may have to handle these exchanges.

2. Bringing up the enterprise fabric 106 before the enterprise fabric 108:

When the host 104 is plugged into the enterprise fabric 106 before fabrics A and B 108A and 108B are brought up, N_port 1 may FLOGI and get registered with the name server on the interface switch 100. However, name server entries from enterprise fabrics 108A and 108B may not yet be available to perform Fibre Channel operations to targets within the enterprise fabrics 108A and 108B. Subsequently, fabrics A and B 108A and 108B may be brought up and the interface switch 100 may perform FLOGI and FDISC to get a virtual address assignment for N_port 1 and retrieve name server entries from the enterprise fabric 108, after which N_port 1 can PLOGI into devices and perform other operations as usual.

Since the enterprise fabric 106 and enterprise fabric 108 are brought up independently of each other, service parameters assigned to N_ports during the fabric login process may be different. The service parameters of importance are the time out values. It is important that the hosts 104 in the enterprise fabric 106 have timeout values (E_D_TOV and RA_TOV) that are equal to or less than the timeout values provided by the enterprise fabrics 108 to the virtual N_ports of the interface switch 100. It is possible to enforce this if the enterprise fabrics 108 are brought up before the enterprise fabric 106 is brought up. However, in the case that the enterprise fabric 106 is brought up first, and the timeout values assigned to the host 104 ports happen to be higher than those assigned to the virtual N_ports by the enterprise fabric 108, the hosts 104 should be forced to log out and log into the enterprise fabric 106 again.

After receiving an LS_ACC for its FLOGI request, each host 104 can register for RSCN, perform an N_port login with the name server of the switch 102 and register with the switch 102 name server. FCP probing may also be triggered following the FLOGI and the interface switch's 100 name server may be updated. The hosts 104 may also want to query the name server database and perform N_port login with target devices in the enterprise fabric 108. In order to do this, proxy addresses for the union of name server entries within the enterprise fabrics 108 need to be assigned and the proxy addresses exposed to the host blades 104. As mentioned earlier, a mapping table may be maintained by the interface switch 100. In addition to the mappings between the virtual N_port and physical N_port identifiers, mappings between the proxy addresses and enterprise addresses 108 may be maintained in the mapping table.

If the hosts 104 complete their login and registration and the interface switch 100 has not yet completed the link initialization, login and FDISC to the enterprise fabrics 108, the hosts 104 may not yet be able to see the targets connected to enterprise fabrics 108 in the enterprise fabric 106 name server. The host 104 may be able to subsequently PLOGI only when the targets become visible. This enables the enterprise fabric 108 build to be completed (all domains are reachable) and routes to be established before the hosts 104 start querying about or attempt to PLOGI into the devices connected to the enterprise fabric 108.

On the other hand, if the interface switch 100 has already completed FLOGI and FDISC with the enterprise fabric 106 and enterprise fabric 108 devices have been registered with the name server, the hosts 104 can discover devices by querying the enterprise fabric 106 name server for the targets.

The addition of an additional host 104 into the enterprise fabric 106 may trigger a new FDISC to the enterprise fabric 108 and the assignment of a virtual N_port id and not a FLOGI. Since FDISC does not trigger FCP probing and name server updates, this process may be less disruptive to the enterprise fabric 108. The interface switch 100 may handle FCP probing of the hosts 104 and perform name server updates to its name server database based on the probes.

In FIG. 7, PNP1-A is the virtual PID assigned for N_port 1 by Fabric A 108A and PNP1-B is the virtual PID assigned by Fabric B 108B for N_port 1. Since PNP1-A and PNP1-B are assigned by two independent fabrics, they could be identical and the mapping should be able to handle this. Similarly, the PIDs of devices in Fabric A and B 108A and 108B may collide and proxy addresses may have to be maintained to provide a unique address space that is scoped by fabric.

In order to create separate namespaces for PIDs per enterprise fabric 108 that are connected to the interface switch 100, each enterprise fabric 108 is assigned a unique identifier by the interface switch 100, known as the "proxy domain identifier." The proxy domain identifier may be filled into the "domain" field of the SID/DID for frames that are initiated from/targeted to switches/devices in the enterprise fabrics 108A and 108B and the remaining 16 bits of the address may be used to uniquely identify ports in each of the fabrics 108A and 108B.

Similarly, the virtual PIDs, assigned via NPV, may be used to address the interface switch 100 and hosts 104 within the enterprise fabric 106. The interface switch 100 may map these proxy and virtual addresses to physical addresses as described below.

Since the interface switch 100 serves as a proxy between the enterprise fabric 106 and enterprise fabric 108, it has to map between virtual N_port ids assigned by the enterprise fabric 108 and N_port ids assigned by the enterprise fabric 106. Similarly, it has to map between the virtual proxy addresses for devices in the enterprise fabric 108 and physical addresses. These mappings may be maintained in a separate PID mapping table.

The PID mapping table contains mappings between physical and virtual host N_port ids and also between physical and proxy enterprise fabric 108 device N_port ids. When control or data frames from the host 104 are targeted to a device in the enterprise fabric 108, the SID may be mapped to the virtual N_port id at the interface switch 100. The DID may be mapped from the proxy address to the physical address and sent to the right interface switch 100 egress port. These mappings are performed using a PID mapping table. An exemplary PID mapping table is shown in FIG. 7. This table is used to populate the translation tables in the interface switch 100.

The table may be divided into sections that are indexed by the proxy domain identifier and the address of the interface switch 100 virtual N_port connected to the enterprise fabrics 108. The Proxy Domain column uniquely identifies the enterprise fabric 108 to which frames from the blade fabric 106 get routed. The domain portion of the DID of all frames targeted to devices in the enterprise fabrics 108 may carry the proxy domain id. The PID mapping table partitions the PID namespace so that there is no possibility of PID conflicts. PID1, PID2 etc. are the physical addresses of ports in the enterprise fabric 108 and PID1', PID2' etc. are the corresponding proxy addresses assigned by the interface switch 100.

The interface switch 100 queries the name server of both Fabric A and B 108A and 108B and populates the physical addresses and the interface switch 100 assigns unique logical proxy addresses pre-fixed with a proxy domain id. The interface switch 100 "listens" for device detected RSCNs from these fabrics 108A and 108B and updates its mapping table. The mapping table also contains mappings between all the physical addresses (N_port 1, N_port 2 etc.) to virtual N_port id (PNP1-A, PNP2-A etc.) for N_ports of the hosts 104.

For frames destined to enterprise fabrics 108, the Proxy Domain (PD0, PD1) field in the DID is used to perform the mapping table lookup. For frames destined from enterprise fabrics 108 to hosts 104, the lookup is performed based on interface switch 100 virtual N_port (NPV1, NPV2).

Host 104 may send a frame to a virtual target PID in Fabric A 108A from N_port 1. interface switch 100 may check to see if the virtual PID is within the table partition associated with PD0 or PD1 and translate the proxy address to a physical address. Similarly, frames from the enterprise fabric 108A to the host 104 may be scoped by the virtual N_port (NPV1 or NPV2) and the virtual N_port ids mapped to a physical N_port id from the table.

The host N_port (N_port 1) initiates a PLOGI to a target using the enterprise fabric 106 N_port id as the SID and the interface switch 100 maps the SID to the virtual N_port Id of the enterprise fabric 108. Responses are directed to the virtual N_ports as DIDs and the DIDs are mapped to the blade fabric 106 N_port ids using the mappings in the PID mapping table. Similarly, the PIDs contained in the data traffic may require a wire-speed mapping of PIDs. Mapping control traffic from the hosts 104 and the enterprise fabric 108 (such as FLOGIs or PLOGIs to the NS) and traffic from the enterprise fabric 108 to the hosts 104 is mediated by the interface switch 100 processor, and the mapping is implemented using a logical PID mapping table. The SID/DID used in management frames for the hosts 104 N_port may be the virtual PIDs. Some control traffic, such as certain types of ELS and NS responses, carry PIDs in their payload. In these cases the addresses in the payloads must also be mapped using the PID mapping table.

The PID mapping table entry may be updated when a PID is assigned by the enterprise fabric 106 to a host 104 N_port and updated whenever a corresponding virtual N_port id is returned by the enterprise fabric 108 in response to an FDISC (in the case of pre-provisioned virtual PIDs described earlier, a new entry may be created with the creation of a new virtual PID). Removal of a host 104 may cause removal of the corresponding virtual N_port id from name server and removal of the PID mapping table entry.

Only those devices in the enterprise fabric 108 that are zoned to one or more of the host 104 ports in the enterprise fabric 106 may have an entry in the enterprise fabric 106 name server and the PID mapping table. Hence the number of entries in the interface switch's 100 PID mapping table may be equal to the sum of the total number of devices in the enterprise fabrics 108 that are zoned to one or more of the host 104 ports in the enterprise fabric 106 and the total number of hosts 104.

As an example, consider a frame initiated from physical address N_port 1 of the host 104, to target physical address PID1 in enterprise fabric A 108A. The SID/DID fields in the frame headers are:

At host 104: SID=N_port 1, DID=PID1'

At interface switch 100: SID=PNP1-A, DID=PID1 (based on lookup indexed by proxy domain id field of DID, PD0).

In Fabric A 108: SID=PNP1-A, DID=PID1

Now consider a frame targeted to physical address N_port 1 of host 104 from physical address PID1 of initiator in enterprise fabric A 108A. The SID/DID fields in the frame headers are:

In Fabric A 108A: SID=PID1, DID=PNP1-A

At interface switch 100: SID=PID1', DID=N_port 1 (based on lookup indexed by interface switch ingress virtual N_port, NPV1).

At host 104: SID=PID1', DID=N_port 1

Figure 8:
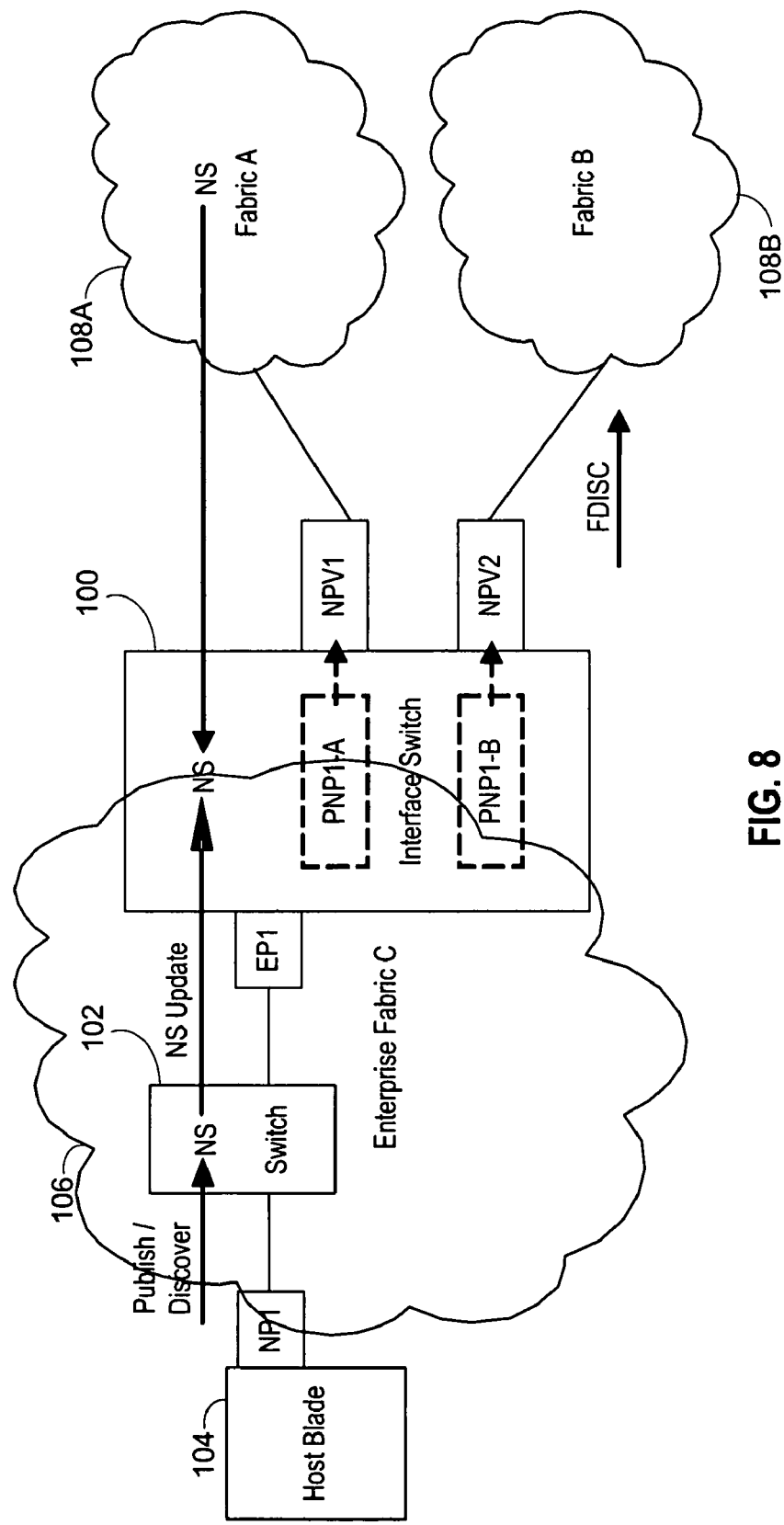
FIG. 8 depicts a device registration and discovery procedure according to the present invention.

Following the login and initialization process described above, the enterprise fabric 108 name server may retrieve new and deleted NPV device bitmaps from the switch driver of the switch that was involved in the NPV. Since device entries for all devices in enterprise fabrics 108 are maintained in the PID mapping table, response to all host 104 requests may be performed by the interface switch 100 and do not need to trigger queries to the name server on the enterprise fabric 108. The interface switch 100 may update its own name server based on the registration and deregistration of hosts 104 and respond to any host 104 related name server queries. It may register for RSCNs in order to update its mapping table when devices enter and leave the enterprise fabric 108. When hosts 104 are disconnected, the NPV ports will send corresponding FLOGOs to the enterprise fabric 108 and the interface switch 100 will flush the addresses of the disconnected hosts 104 from its name server and from its PID mapping table. Such registration and discovery is illustrated schematically in FIG. 8.

Figure 9:
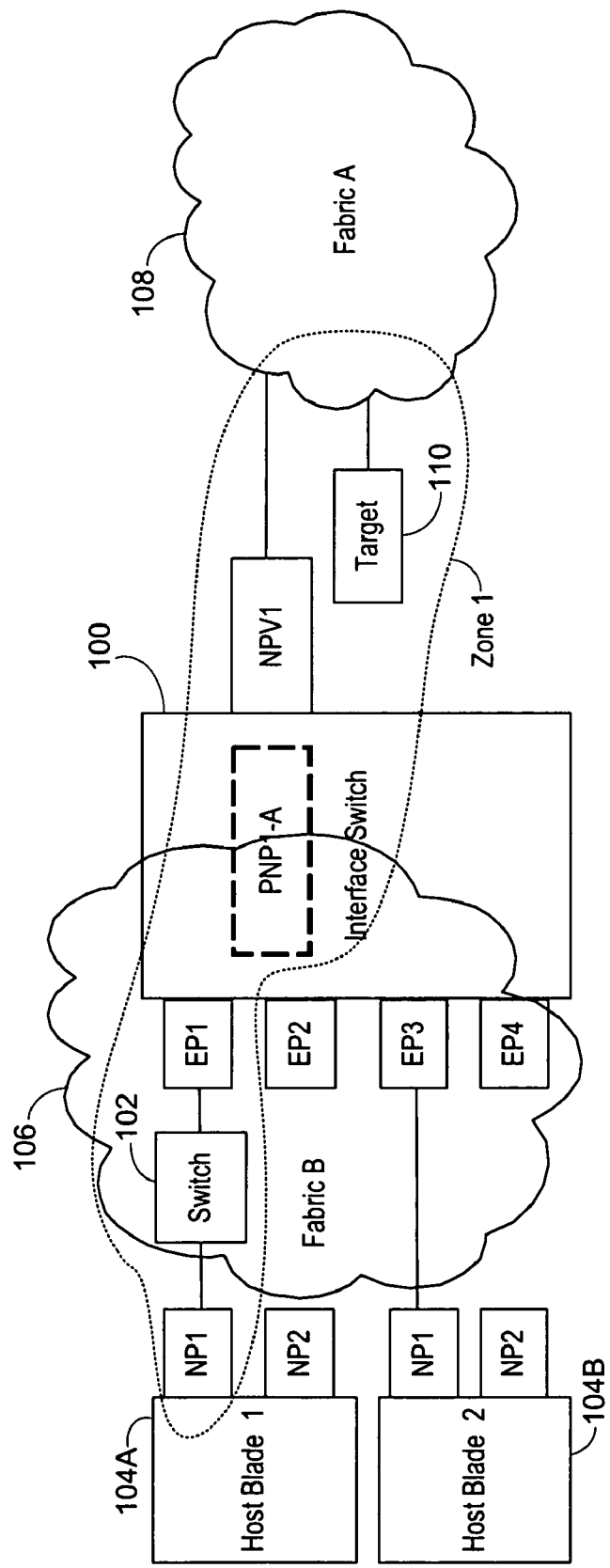
FIG. 9 depicts zoning across enterprise fabrics according to the present invention.

The interface switch 100 does not impact Worldwide Named (WWN) based zoning. For domain, port based zoning, virtual N_port ids may be mapped to PIDs using the PID mapping table. To add a host 104 N_port to a zone, the virtual PID may be looked up in the PID mapping table and used as the PID for this port to be zoned. Such zoning is illustrated in FIG. 9 wherein hosts 104A and 104B connect to fabric A 108 via the interface switch 100.

In order to provide fault tolerance and better link utilization that can reduce the possibility of congestion, interface switch 100 configurations may be able to support multiple paths from a host 104 to a target 10 in the enterprise fabric 108. Depending on the capabilities of the host 104, it is possible to perform load balancing and/or failover.

Figure 10:
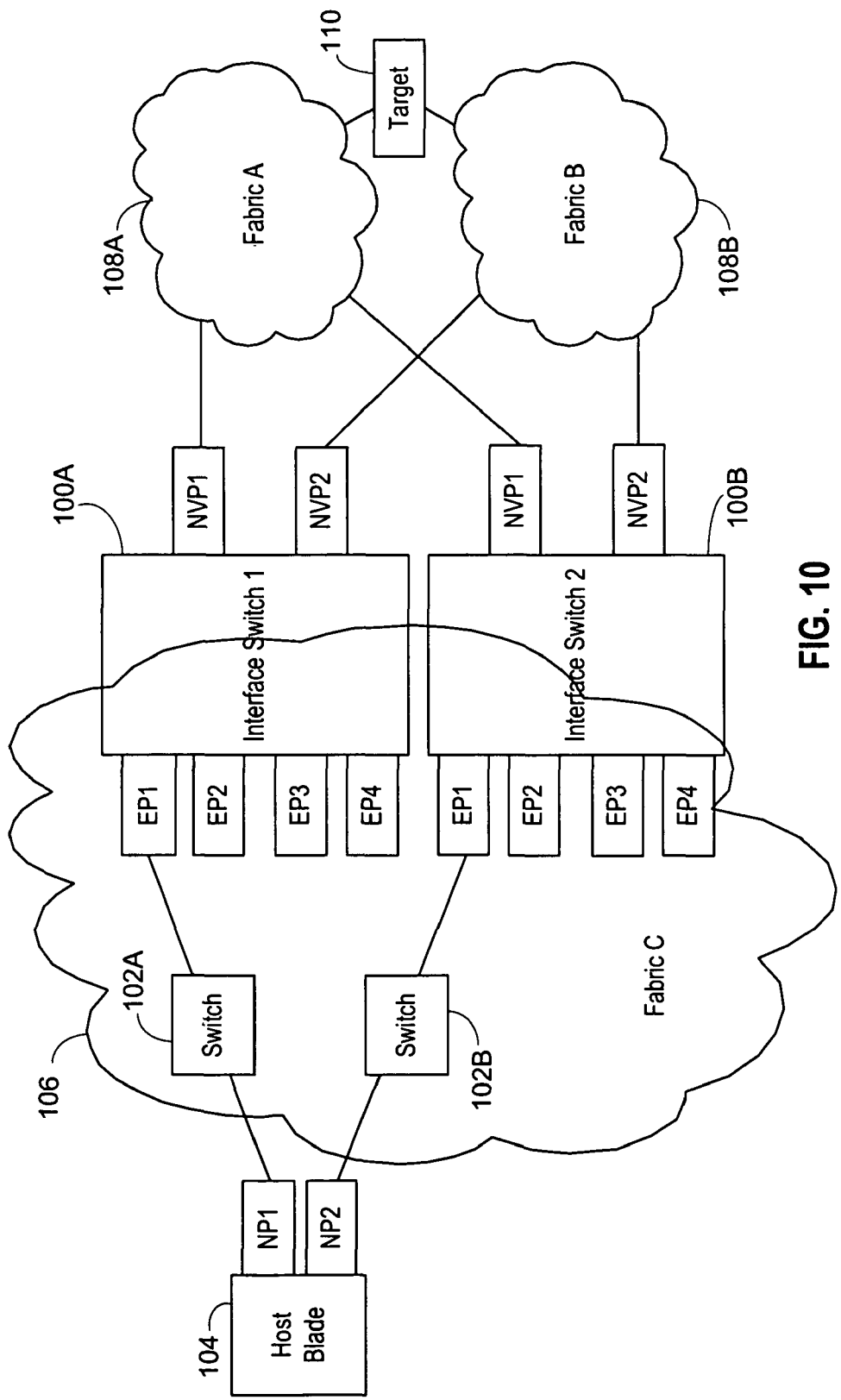
FIG. 10 shows load balancing and failover with two interface switches according to the present invention.

FIG. 10 shows a dual interface switch 100 configuration. This configuration allows a host 104 to be connected to two fabrics A and B 108A and 108B, over separate interface switches 100A and 100B. If the multipathing firmware in the host 104 supports load balancing, it is possible for the host 104 to send frames to fabric A 108A or fabric B 108B on both N_port 1 and N_port 2.

If the multipathing software is capable of supporting failover, the host 104 can send frames from N_port 2 if the path from N_port 1 to the target is not available for any reason, such as link going down or interface switch 104A failing. The interface switches 100A, 100B support failover in that if interface switch 100A fails, it results in interface switch 100B taking over and the enterprise fabrics 108 are not subjected to disruption.

In order to support in-band fabric management, for queries via CT pass thru from the host bus adapter, management CT frames may be allowed through the interface switch 100 into enterprise fabrics 108. In order to support dynamic queries to the host bus adapter using FDMI-2, CT frames from enterprise fabric 108 switches may be allowed through the host bus adapter to the hosts 104. CT frames may be directed to the interface switch's 100 management server and the interface switch 100 may have the same level of management capabilities as the management server on any other switch. As mentioned earlier, the interface switch's 100 CPU is responsible for the address mappings of these CT frames.

In-band discovery from enterprise fabrics 108 may result in the interface switch 100 being discovered as a node that is connected to that enterprise fabric 108 and hence may result in a partial view of the topology. The discovered N_port ids of the hosts 104 may be used to perform zoning.

In band discovery with the interface switch 100 as a proxy may result in discovery of switches and devices in the enterprise fabrics 108 as well as the discovery of hosts 104 and may result in a more complete topology discovery, through the switches in the other enterprise fabric 106 or 108 will not be discovered.

From an element management perspective, the interface switch 100 should be treated as a new type of switch that exposes E_ports and N_ports. In order to enforce frame filtering at the interface switch 100, the interface switch 100 may be configured with access control policies.

In the NPV implementation described in above references, the SID/DID validation in the miniswitch is turned off since NPV requires a PID to be assigned by the enterprise fabric 108. Hence the DID field in the transmitted frames and the SID fields in the received frames that are expected to match at the enterprise fabric's F_port, do not match in the case of NPV. This opens up security threats since the main purpose of the SID/DID checking is to prevent spoofing of authorized devices by unauthorized devices by using the PID of the authorized device. However, since the interface switch 100 is acting as an intermediary in this case, it can prevent rogue devices from spoofing since the SID/DID checking happens at the E_port of the interface switch 100. Further, the security threats can be mitigated using zones of trust.

Figure 11:
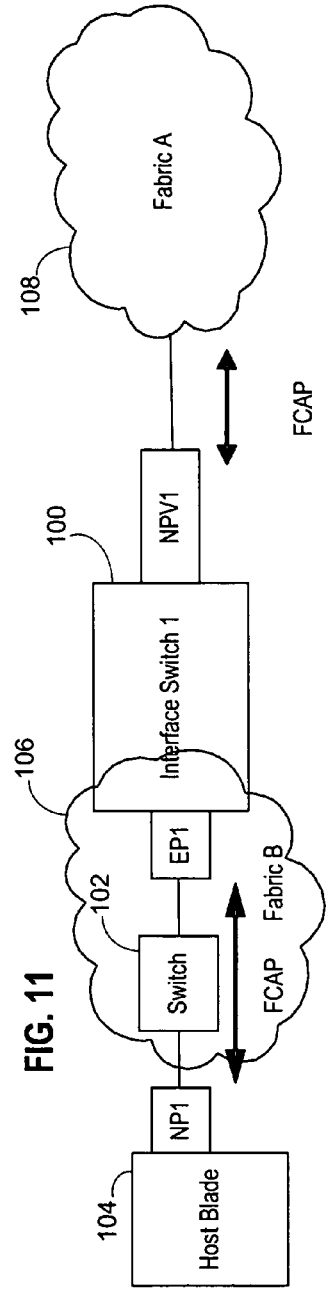
FIG. 11 shows the use of a Fibre Channel authentication protocol according to the present invention.

The FCAP protocol, as explained in U.S. patent application Ser. No. 10/062,125 filed Jan. 31, 2002 entitled "Network Security and Applications to the Fabric Environment" which is hereby incorporated by reference, is used by Secure FabOS to establish zones of trust. Hosts 104 and the interface switch 100 are part of the enterprise fabric 106 and may be part of that fabric's zone of trust. Similarly, the interface switch 100 may be part of the enterprise fabric's 108 zone of trust. FIG. 11 is a schematic representation showing FCAP between host 104 and the interface switch 100 and between the interface switch 100 and fabric A 108.

Secure FabOS also has the notion of security policies that limit access to the fabric. One set of policies, the Device Connection Control (DCC) policies, may be used to determine which hosts 104 are allowed to connect to F_ports within the enterprise fabric 108. DCC policies may be exported from the enterprise fabrics 108 to the interface switch 100 and enforced at the interface switch 100.

Due to the unique placement of the interface switch 100 at the edge of the enterprise fabrics 106 and 108, it can further bolster the capabilities of Secure FabOS. Rules can be defined and enforced at the interface switch 100 such that certain frames are filtered out and not allowed access into the enterprise fabrics 106 and 108. These rules might take the form of access control policies or the form of policies that detect patterns in an attempt to differentiate legitimate traffic from intrusions.

In the above example each NPV port on the interface switch 100 is limited to 255 nodes due to AL_PA addressing limitations. If either fabric has more than 255 nodes, then either multiple ports must be used or a limit on the number of nodes is needed. Further, it may be desirable to the nodes which communicate for security and simplification reasons. In such instances, nodes can be selected for use by a given port using management software as described in U.S. patent application Ser. No. 10/356,392, entitled "Method and Apparatus for Routing Between Fibre Channel Fabrics," filed Jan. 31, 2003. An alternative is to use a technique similar to the zoning described in U.S. patent application Ser. No. 10/903,877, entitled "Multifabric Zone Device Import and Export," filed Jul. 30, 2004, which is hereby incorporated by reference. It may also be the case that it is desirable to limit the number of nodes being linked by a given NPV port for traffic reasons, in which case similar selection techniques can be used. It is further understood that multiple ports can be trunked, in which case they behave as a single port, with communication between the ports to handle the mapping.

A new type of switch, an interface switch, has been described. The interface switch presents conventional E-ports to first fabric, allowing it to operate in a proprietary, high performance mode in the first fabric, and virtual N_ports to other fabrics, which is a full performance, non-proprietary mode. Thus the interface switch allows communication between fabrics from two different manufacturers, each fabric operating in its proprietary mode.

While the majority of this description has focused on the aspects of the interface switch relating to inter-fabric communication, it is understood that the interface switch 100 can also operate as any other switch in enterprise fabric 106, namely by performing conventional switching and routing between its various E_ports.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A data switching device for connecting first and second fabrics, each fabric having at least one node connected, the device comprising: a plurality of inter-switch ports for connecting to the first fabric; a node port for connecting to the second fabric, the second fabric brought up independently of the first fabric; a switch coupled to said plurality of inter-switch ports and said node port and interconnecting said ports; wherein said node port operates as a virtual node port; and wherein said plurality of inter-switch ports form a portion of the first fabric when connected.

2. The device of claim 1, wherein there is one virtual node address for each of the nodes connected to the first fabric.

3. The device of claim 1, further comprising: an intermediate port coupled to said switch, wherein said switch routes frames between said plurality of inter-switch ports and said node port through said intermediate port.

4. The device of claim 3, wherein the interconnection between said intermediate port and either said plurality of inter-switch ports or said node port is a private interconnection and said intermediate port and said other port perform public to private and private to public address translations.

5. The device of claim 1, wherein said switch performs address translations between said plurality of inter-switch ports and said node port.

6. The device of claim 1, wherein said switch performs public to private and private to public address translations between said plurality of inter-switch ports and said node port.

7. A network comprising: a first fabric with at least one node connected; a second fabric brought up independently of said first fabric; and a data switching device connected to said first and second fabrics, said device including: a plurality of inter-switch ports connected to said first fabric and forming a portion of said first fabric; a virtual node port connected to said second fabric; and a switch coupled to said plurality of inter-switch ports and said node port for interconnecting said ports.

8. The network of claim 7, wherein there is one virtual node address for each of the nodes connected to the first fabric.

9. The network of claim 7, said data switching device further comprising: an intermediate port coupled to said switch, wherein said switch routes frames between said plurality of inter-switch ports and said node port through said intermediate port.

10. The network of claim 9, wherein the interconnection between said at least one intermediate port and either said plurality of inter-fabric ports or said node port is a private interconnection and said intermediate port and said other port perform public to private and private to public address translations.

11. The network of claim 7, wherein said switch performs address translations between said plurality of inter-switch ports and said node port.

12. The network of claim 7, wherein said switch performs public to private and private to public address translations between said plurality of inter-fabric ports and said node port.

13. A network comprising: first and second fabrics; a series of nodes, each having two ports, one port of each node connected to one of said first and second fabrics; a third fabric brought up independently of said first and second fabrics; and two data switching devices, each connected to said third fabric, with one device connected to said first fabric and one device connected to said second fabric, each said device including: a plurality of inter-switch ports connected to said respective first or second fabric and forming a portion of that fabric; a virtual node port connected to said third fabric; and a switch coupled to said plurality of inter-switch ports and said node port for interconnecting said ports.

14. The network of claim 13, wherein there is one virtual node address for each of the nodes connected to the first or second fabric.

15. The network of claim 13, each switching device further comprising: an intermediate port coupled to said switch, wherein said switch routes frames between said plurality of inter-switch ports and said port through said intermediate port.

16. The network of claim 15, wherein the interconnection between said at least one intermediate port and either said plurality of inter-switch ports or said node port is a private interconnection and said intermediate port and said other port perform public to private and private to public address translations.

17. The network of claim 13, wherein said switch performs address translations between said plurality of inter-switch ports and said node port.

18. A network comprising:
first and second fabrics;
a series of nodes, each having two ports, one port of each node connected to one of said first and second fabrics;
third and fourth fabrics, wherein said third fabric is brought up independently of said first and second fabrics and said fourth fabric is brought up independently of said first and second fabrics; and
two data switching devices, one connected to said first, third and fourth fabrics, and one connected to said second, third and fourth fabrics, each said device including:
a plurality of inter-switch ports connected to said respective first or second fabric and forming a portion of that fabric;
two virtual node ports, one connected to each of said third and fourth fabrics; and a switch coupled to said plurality of inter-switch ports and said two node ports for interconnecting said ports.

19. The network of claim 18, wherein there is one virtual node address for each of the nodes connected to the first or second fabric.

20. The network of claim 18, each data switching device further comprising: two intermediate ports coupled to said switch, wherein said switch routes frames between said plurality of inter-switch ports and said two node ports through one of said intermediate ports.

21. The network of claim 20, wherein the interconnection between each of said intermediate ports and either said plurality of inter-switch ports or said node ports is a private interconnection and said intermediate ports and said other ports perform public to private and private to public address translations.

22. The network of claim 18, wherein said switch performs address translations between said plurality of fabric ports and said node ports.

23. A network comprising: first and second fabrics; a series of nodes, each having two ports, one port of each node connected to one of said first and second fabrics; third and fourth fabrics, wherein said third fabric is brought up independently of said first and second fabrics and said fourth fabric is brought up independently of said first and second fabrics; and two data switching devices, one connected to said first and third fabrics and one connected to said second and fourth fabrics, each said device including: a plurality of inter-switch ports for connecting to said respective first or second fabric and forming a portion of that fabric; two virtual node ports for connecting to one of said third or fourth fabrics; and a switch coupled to said plurality of inter-switch ports and said two node ports for interconnecting said ports.

24. The network of claim 23, wherein there is one virtual node address for each of the nodes connected to the first or second fabric.

25. The network of claim 23, each data switching device further comprising: two intermediate ports coupled to said switch, wherein said switch routes frames between said plurality of inter-switch ports and said two node ports through one of said intermediate ports.

26. The network of claim 25, wherein the interconnection between each of said intermediate ports and either said plurality of inter-switch ports or said node ports is a private interconnection and said intermediate ports and said other ports perform public to private and private to public address translations.

27. The network of claim 23, wherein said switch performs address translations between said plurality of inter-switch ports and said node ports.

28. A method for routing between first and second fabrics using a data switching device, the method comprising: providing a plurality of inter-switch ports on the device for connecting to the first fabric and forming a portion of the first fabric when connected; providing a virtual node port on the device for connecting to the second fabric, the second fabric brought up independently of the first fabric; and interconnecting said plurality of inter-switch ports and said node port.

29. The method of claim 28, further comprising assigning one virtual node address for each of the nodes connected to the first fabric.

30. The method of claim 28, further comprising: routing frames between said plurality of inter-switch ports and said node port through an intermediate port on the device.

31. The method of claim 30, wherein the interconnection between said at least one intermediate port and either said plurality of inter-switch ports or said node port is a private interconnection and said at least one intermediate port and said other port perform public to private and private to public address translations.

32. The method of claim 28, further comprising: performing address translations between said plurality of inter-fabric ports and said node port.

33. A Fibre Channel switch for connecting to a first fabric formed using switches conforming to the protocols of a first manufacturer and a second fabric formed using switches conforming to the protocols of a second manufacturer, each fabric having at least one node connected, the switch comprising: a plurality of E_ports for connecting to the first fabric, forming a portion of the first fabric when connected and operating according to the protocols of the first manufacturer; a virtual N_port for connecting to the second fabric, the second fabric brought up independently of the first fabric; and a switch circuit coupled to said plurality of E_ports and said N_port for interconnecting said ports.

34. The switch of claim 33, wherein there is one virtual node address for each of said nodes connected to the first fabric.

35. The switch of claim 33, further comprising: an intermediate port coupled to said switch circuit, wherein said switch circuit routes frames between said plurality of E_ports and said N_port through said intermediate port.

36. The switch of claim 35, wherein the interconnection between said intermediate port and either said plurality of E_ports or said N_port is a private interconnection and said intermediate port and said other port perform public to private and private to public address translations.

37. The switch of claim 33, wherein said switch circuit performs address translations between said plurality of E_ports and said N_port.

38. A network comprising: a first fabric formed using switches conforming to the protocols of a first manufacturer; a first series of nodes connected to said first fabric; a second fabric formed using switches conforming to the protocols of a second manufacturer brought up independently of said first fabric; a second series of nodes connected to said second fabric; and a Fibre Channel switch connected to said first and second fabrics, said switch including: a plurality of E_ports connected to said first fabric, forming a portion of said first fabric and operating according to the protocols of the first manufacturer; at least one virtual N_port connected to said second fabric; and a switch circuit coupled to said plurality of E_ports and said at least one N_port for interconnecting said ports.

39. The network of claim 38, wherein there is one virtual node address for each of the nodes connected to the first fabric.

40. The network of claim 38, said Fibre Channel switch further comprising: an intermediate port coupled to said switch circuit, wherein said switch circuit routes frames between said plurality of E_ports and said N_port through said intermediate port.

41. The network of claim 40, wherein the interconnection between said at least one intermediate port and either said plurality of E_ports or said N_port is a private interconnection and said at least one intermediate port and said other port perform public to private and private to public address translations.

42. The network of claim 38, wherein said switch circuit performs address translations between said plurality of E_ports and said N_port.

* * * * *